(12) United States Patent
Nebe et al.

(10) Patent No.: US 6,641,145 B1
(45) Date of Patent: Nov. 4, 2003

(54) MINIATURE DRILL CHUCK

(75) Inventors: Gerd Nebe, Wuppertal (DE); Herbert Casel, Wuppertal (DE)

(73) Assignee: Robert Schröder GmbH & Co. KG, Wuppertal (DE)

(*) Notice: Subject to any disclaimer, the term of this patent is extended or adjusted under 35 U.S.C. 154(b) by 0 days.

(21) Appl. No.: 10/089,124
(22) PCT Filed: Sep. 21, 2000
(86) PCT No.: PCT/EP00/09228
§ 371 (c)(1), (2), (4) Date: Mar. 22, 2002
(87) PCT Pub. No.: WO01/21348
PCT Pub. Date: Mar. 29, 2001

(30) Foreign Application Priority Data

Sep. 23, 1999 (DE) .......................... 199 45 551

(51) Int. Cl.⁷ ............................................. B23B 31/173
(52) U.S. Cl. ...................... 279/49; 279/46.7; 279/54; 279/56; 279/64
(58) Field of Search ............. 279/46.7, 48–49, 279/51–56, 59–65, 69, 902; 29/525; 403/282

(56) References Cited

U.S. PATENT DOCUMENTS

| | | | |
|---|---|---|---|
| 1,542,826 A | * 6/1925 | Nielsen .................. 279/69 |
| 2,413,422 A | * 12/1946 | Tiege et al. ............ 279/64 |
| 2,553,990 A | * 5/1951 | Vidal .................... 279/56 |
| 2,678,827 A | * 5/1954 | Cawi .................... 279/56 |
| 3,053,118 A | * 9/1962 | Lavallee ............... 403/282 |
| 3,132,871 A | * 5/1964 | Stewart ................. 279/49 |
| 3,673,777 A | * 7/1972 | Wber .................... 29/525 |
| 3,712,633 A | * 1/1973 | Schadlich ............. 279/58 |
| 4,269,550 A | * 5/1981 | DiGiulio ............... 408/241 B |
| 4,527,809 A | * 7/1985 | Umbert ................. 279/64 |
| 5,816,583 A | * 10/1998 | Middleton ............ 279/62 |

FOREIGN PATENT DOCUMENTS

DE 692670 A * 6/1940 .............. 279/60

* cited by examiner

Primary Examiner—Steven C. Bishop
(74) Attorney, Agent, or Firm—Gudrun E. Huckett

(57) ABSTRACT

A miniature drill chuck has a drill chuck housing and a thrust member positioned in the interior for moving clamping jaws into their clamping position during a threading movement of the drill chuck housing onto a machine spindle. The thrust member is longitudinally moveable in a guide bore of the drill chuck housing while being centered circumferentially about its entire stroke. A pair of truncated cone surfaces is provided between the machine spindle and the thrust member, wherein the machine spindle centers the thrust member via the pair of truncated cone surfaces when loading the thrust member.

10 Claims, 1 Drawing Sheet

MINIATURE DRILL CHUCK

BACKGROUND OF THE INVENTION

1. Field of the Invention

The present invention relates to a miniature drill chuck comprising a drill chuck housing comprised of a drill chuck head and a drill chuck plug arranged at a drive side and having a central thread for a machine spindle, wherein the drill chuck head has an inner wall conically converging in the direction to the receiving opening for a drilling tool, a milling tool, or a grinding tool, on which matching conical clamping jaws are guided longitudinally slidably and under a pretension force acting in the circumferential direction, wherein the clamping jaws are loaded on their rearward surface by a thrust member which is moved in the direction toward the receiving opening by threading the drill chuck housing into the machine spindle with simultaneous entrainment of the clamping jaws moving toward one another into the clamping position.

2. Description of the Related Art

Such miniature drill chucks are known in general (Hitachi or Goodell).

The principle of such miniature drill chucks resides in a thread which is provided at the backside in the drill chuck housing and into which a corresponding thread of the machine spindle is threaded.

By a slow advancing motion of the threaded pair a movement in the direction to the receiving opening is exerted onto the clamping jaws arranged within the drill chuck head which allows the clamping jaws to move toward one another into their clamping position.

This is realized by a movement of the clamping jaws against a pretension force acting in the circumferential direction so that upon opposite rotational movement of the miniature drill chuck relative to the machine spindle the clamping jaws are returned from their clamping position into the release position.

Such miniature drill chucks must be differentiated from conventional drill chucks where the advancing movement of the clamping jaws is initiated by means of a drill chuck ring with gearwheel in connection with a special drill chuck key.

Since such miniature drill chucks are designed particularly for high to very high rotary speeds, the subject of the present invention is primarily used in miniature drill chucks with a clamping width up to approximately 6 mm diameter and for rotary speeds of above 10,000 rpm.

The special problem in regard to these high rotary speeds is the vibration tendency of the entire drive train from the motor to the tool which also contributes to a vibration excitation of the entire system, in particular, when passing through the critical rotary speeds. It is therefore particularly important to manufacture such miniature drill chucks with low characteristic vibration over the entire rotary speed range.

In the context of the present invention, very high rotary speeds are to be understood as rotary speeds above 20,000.

SUMMARY OF THE INVENTION

Under these conditions, it is an object of the invention to improve the entire known miniature drill chuck such that it produces an excellent clamping action even at rotary speeds above 20,000 rpm with reduced vibration over the entire rotary speed range.

This object is solved by the invention in that the thrust member is longitudinally moveable in a guide bore of the drill chuck housing and is circumferentially centered along its entire stroke.

Important for the invention is a tight fit between the outer diameter of the thrust member and the correlated inner bore of the drill chuck housing which reliably prevents a radial movement of the thrust member in the drill chuck housing in all operational states.

For this purpose, a guide bore is provided in the drill chuck housing within which the thrust member is circumferentially guided and remains guided about its entire available stroke.

Since the thrust member must be supported longitudinally slidably during the advancing movement of the clamping jaws within the drill chuck housing, the requirement in regard to a tight guiding fit between thrust member and guide bore must be realized over the entire stroke of the thrust member.

This results in the advantage that the dynamic balancing conditions of the miniature drill chuck are maintained over the entire rpm range to be used up to the maximum rpm. The special feature of the invention thus resides in a fit of the thrust member within the guide bore which is radially tight but axially moveable.

This requirement can be fulfilled in regard to the miniature drill chucks in that, as a result of only minimal clamping diameters of such miniature drill chucks, radial movements of the thrust member within the guide bore have practically no effect up to highest rotary speeds.

Expediently, the guide bore is provided in the drill chuck plug. This measure has the advantage of a very light drill chuck head so that the masses positioned with relatively great spacing to the machine spindle remain relatively minimal.

When on the drill chuck plug a circumferential knurling is provided by which a press fit can be a achieved in the correlated bore of the drill chuck head, the mounting expenditure for the drill chuck housing can be significantly reduced. In spite of this, the circumferential knurling provides always a precise centering of the drill chuck plug within the drill chuck head.

Important in connection with the invention is a precise guiding of the thrust member in the drill chuck housing over its entire stroke. For this purpose, it is suggested that the length of the thrust member in the guide bore is at least as great as the diameter of the thrust member. This measure suppresses the tendency of too-short thrust members against canting and ensures an unbalance-free operation.

In addition, it may be provided that the thrust member is weight-reduced with rotational symmetry in order to additionally reduce the moved masses. For this purpose, the thrust member can have an outer groove on its circumference. Optionally, the thrust member can also be of a hollow sleeve shape. As a supplement or in addition, it can also be provided that the drill chuck plug is furnished with corresponding measures for reducing its weight. This can easily include circumferential grooves, radial bores, material cutouts, as long as they are arranged with rotational symmetry.

These measures for reducing the rotating mass concern therefore primarily the thrust member. However, corresponding measures for reducing weight can be provided also at least on the drill chuck plug or the drill chuck head, which measures are to be included in the present invention.

In order to achieve a further improvement of the guiding action of the thrust member, the end of the thrust member facing the spindle can be machined to a reduced outer diameter relative to the inner diameter of the drill chuck plug so that between the drill chuck plug and the thrust member an annular gap space is produced. A hollow-cylindrical machine spindle can be screwed into this annular gap space which is supported with an outer thread on a corresponding inner thread of the drill chuck plug while its end area is used at the same time for moving the thrust member.

For centering the thrust member, additionally a central truncated cone surface can be provided which is arranged on the bottom of the annular gap space. A matching truncated cone surface of the drive spindle is to be seated on this central truncated cone surface.

In order to make available an additional lever arm for obtaining the clamping position of the clamping jaws, key surfaces which are positioned opposite one another with regard to rotational symmetry can be provided on the drill chuck head or the drill chuck plug.

BRIEF DESCRIPTION OF THE DRAWINGS

In the following, the invention will be explained in more detail with the aid of one embodiment.

DESCRIPTION OF PREFERRED EMBODIMENTS

Figure 1:
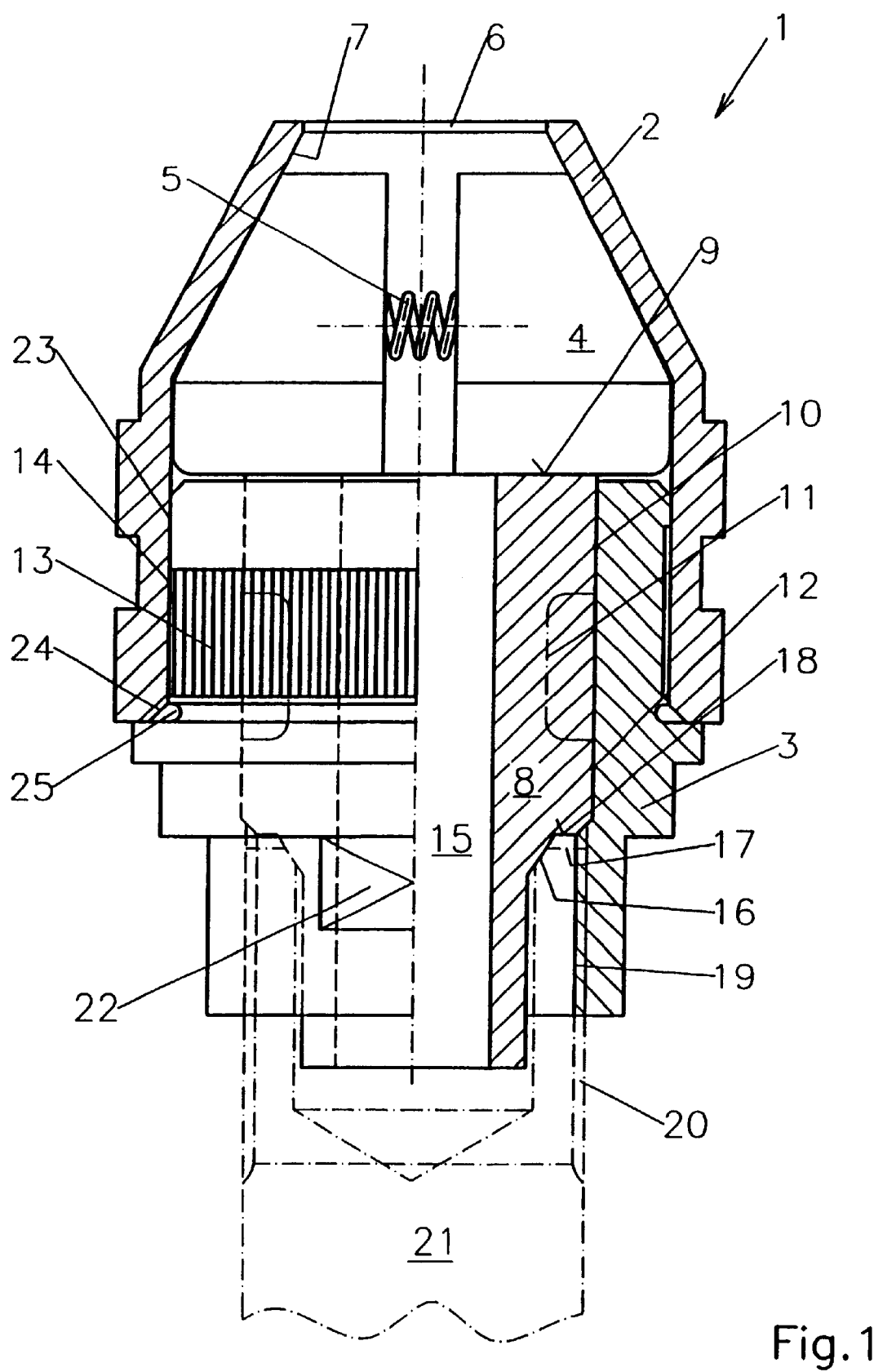
FIG. 1 shows a miniature drill chuck 1 according to the invention.

Such a miniature drill chuck 1 has a drill chuck housing which is comprised of a drill chuck head 2 and a drill chuck plug 3. The drill chuck head 2 is rigidly connected with the drill chuck plug 3 and receives in the common interior—usually—three clamping jaws 4 whose outer contour converges conically in the direction toward the receiving opening 6. The clamping jaws 4 are subjected to the action of pretension springs 5 in the circumferential direction which serve for providing an outward movement of the clamping jaws 4. In this connection, the outer surfaces of the clamping jaws 4 are moved against a matching conically converging inner wall 7 of the drill chuck head 2. In this way, a positive-locking guiding action of the clamping jaws 4 on the inner wall 7 of the drill chuck head 2 is provided.

For moving the clamping jaws 4 out of the illustrated open position into a clamping position, a thrust member 8 is provided which rests positive-lockingly against the rearward contact surface 9 of the clamping jaws.

The thrust member 8 projects away from the contact surface 9 up to the rearward area of the drill chuck plug 3 and interacts with a corresponding counter surface on the machine spindle 21. For this purpose, the machine spindle 21 rests positive-lockingly against a counter surface of the thrust member 8. On its outer diameter the machine spindle 21 has a spindle thread 20 which interacts with a thread 19 at the inner circumference of the drill chuck plug 3.

In this way, the drill chuck housing can be screwed in and out relative to the machine spindle 21.

In this connection, the thrust member 8, as a result of the positive-locking contact to the machine spindle 21, is moved in the direction toward the receiving opening 6. By means of the contact surface 9 between thrust member 8 and the clamping jaws 4, the clamping jaws are entrained during this movement in the same direction and moved toward one another into the clamping position as a result of the positive-locking guiding on the conical inner wall of the drill chuck head 2.

Important in this context is that the thrust member 8 is longitudinally moveable while circumferentially centered along its entire stroke in a guide bore of the drill chuck housing. This is achieved in that one or more centering zones 10, 12 are provided between the outer circumference of the thrust member 8 and the inner circumference of the chuck plug. In these centering zones, a sufficiently tight fit in the radial direction, which fit allows however free axial movement, is provided between the thrust member 8 and the drill chuck plug 2 so that even upon movement of the clamping jaws 4 into the clamping position for smallest tool diameters, a guiding function is always maintained between the thrust member 8 and the drill chuck plug 3.

Accordingly, in this connection the combination of a practically tilting-free fit in the radial direction with a fit allowing canting-free movement in the axial direction between the thrust member and the drill chuck housing is of great significance. In the present case, this fit is realized however by a guide bore which is provided within the drill chuck plug 3. In order to still achieve an exact centering of the drill chuck plug 3 in the drill chuck head 2, a knurling 13 is provided on the outer circumference of the drill chuck plug 3 which has a slightly greater outer diameter than the inner diameter of the drill chuck head 2. Upon pressing the drill chuck plug 3 into the drill chuck head 2, a clamping zone 14 results in this way in the area of the knurling 13 which, as a result of the clamping action of the drill chuck plug with rotational symmetry, also has rotational symmetry. Moreover, the knurling results in a fixed connection with regard to rotation between the drill chuck head 2 and the drill chuck plug 3. The knurling extends only across a partial length of the inserted drill chuck plug. The forward part 23 of the drill chuck plug has no knurling. The outer diameter of the forward part 23 is matched in the sense of a play-free tight fit to the inner diameter of the drill chuck head. In this way, combined effect results of the tight fit on the forward part 23 of the drill chuck plug and the concentric knurling results. When driving the drill chuck plug into the drill chuck head, the forward part 23 of the drill chuck plug centers itself precisely and without play in the bore of the drill chuck head until the knurling with its ribs beginning at the forward end also contact the bore of the drill chuck head 2. At this point, there is already a fir with exact rotational symmetry realized between the drill chuck plug 3 and the drill chuck head 2. Upon further driving of the drill chuck plug the knurling can be squeezed with the leading central guiding action of the forward part 23 such that additionally also a precise centered fit in the area of the knurling is ensured.

Moreover, the knurling does not extend over the entire insertion length of the drill chuck plug 3 in the drill chuck head 2. In the rearward part of the drill chuck plug a smooth cylindrical seating surface between the drill chuck plug 3 and the drill chuck head 2 is realized.

It is also important that the pressing depth of the drill chuck plug 3 is limited in a defined way by a circumferential collar provided on the end which contacts an end face of the drill chuck head 2. In this connection, in the inner circumferential area of the circumferential collar on the drill chuck head 2 a bezel 24 or the like is provided in order to prevent damaging double fit positions. In addition, the drill chuck plug 3 is provided with a cutout 25 at the lower end of the straight-cylindrical longitudinal area in the area of the transition into the collar forming the stop. This cutout 25 is provided additionally in order to cause possibly peeled-off cuttings or the like of the knurling 13, resulting from mounting of the drill chuck plug 3, to deposit therein. This measure has the advantage that in this longitudinal area of the drill chuck plug important for centering no squeezing by excess material can occur.

This measure moreover provides the possibility to screw into the machine spindle 21 or unscrew from the machine spindle 21 the miniature drill chuck according to this invention without additional tools.

Moreover, FIG. 1 shows that a sufficiently long centering zone between the thrust member 8 and the drill chuck plug 3 is provided which is maintained at least over the entire stroke of the thrust member 8.

In addition, it is provided that the thrust member 8 is comprised of solid material which is weight-reduced with rotational symmetry.

For this purpose, on the outer circumference of the thrust member 8 circumferential grooves 11 can be provided which, however, are preferably arranged between a forward centering zones 10 and a rearward centering zone 12.

This measure has the additional advantage that the wall contact surface between the outer circumference of the thrust member and the inner diameter of the drill chuck plug 3 is reduced. In this way, ease of movement of the thrust member 8 in the axial direction is favored without affecting the play-free radial fit. In addition, a weight-reducing measure is provided in that the thrust member 8 is hollowed by a longitudinal bore 15.

Moreover, FIG. 1 shows that the end of the thrust member 8 facing the spindle has a reduced outer diameter relative to the inner diameter of the drill chuck plug 3 and that a hollow cylindrical machine spindle 21 projects into the annular gap space between the inner diameter of the drill chuck plug 3 and the outer diameter of the thrust member 8.

For this purpose, the free end of the machine spindle 21 is provided with a spindle thread 20 which is threaded into a matching thread 19 of the drill chuck plug facing the spindle to such an extent that the end face of the machine spindle 21 will contact a correlated support surface on the thrust member 8.

For this purpose, the thrust member 8 has a central truncated cone surface 16 which is positioned in the bottom area of the annular gap space. This central truncated cone surface 16 contacts directly a matching truncated cone surface of the drive spindle 21, when the machine spindle 21 has been threaded to a sufficient depth. The average diameters and the cone angles of both truncated cone surfaces match one another precisely so that an additional centering action of the thrust member 8 in the rearward area is realized. In this connection, the end face 17 of the machine spindle 21 is free so that the only fit is realized by the contact zones of the correlated truncated cone surfaces. Accordingly, between the bottom 18 of the annular gap space and the oppositely positioned end face 17 of the machine spindle 21 a contact-free play results so that a reliable centering of the thrust member 8 is obtained also in the rearward area.

In addition, on the outer circumference of the end of the drill chuck housing facing the spindle a pair of key surfaces 22 of rotational symmetry can be provided with which a seized miniature drill chuck can also be released from the clamping position.

The obtainable high natural frequency of the entire component group is important for the miniature drill chuck according to this invention, which natural frequency is achieved with a combination of a relatively short constructive height in connection with very short clamping jaws.

This ensures a true running of the miniature drill chuck over the entire rotational speed range. This causes the required true running of the clamped tool, in particular, when passing through the so-called critical rotary speed. Avoiding unnecessary characteristic vibrations has the additional advantage that the required clamping forces between clamping jaws and tool can be maintained. The entire miniature drill chuck has exclusively exactly centered components which in their interaction, despite their relative movability to one another, realize high clamping forces without characteristic vibrations.

List of Reference Numerals

1 miniature drill chuck
2 drill chuck head
3 drill chuck plug
4 clamping jaw
5 pretension spring
6 receiving opening
7 inner wall
8 thrust member
9 contact surface
10 forward centering zone
11 circumferential groove
12 rearward centering zone
13 knurling
14 clamping zone
15 longitudinal bore
16 central truncated cone surface
17 end face of machine spindle
18 bottom of annular gap space
19 thread
20 spindle thread
21 machine spindle
22 key surface
23 forward fitting part
24 bezel
25 cutout

What is claimed is:

1. A miniature drill chuck (1) for rotary speeds above 10,000 rpm, comprising:

a drill chuck housing comprised of a drill chuck head (2) and a drill chuck plug (3) arranged at a drive side of the miniature drill chuck;

wherein the drill chuck plug (3) has a central thread (19) for receiving a machine spindle (21);

wherein the drill chuck head (2) has a receiving opening (6) for a tool and an inner wall (7) conically converging toward the receiving opening (6);

conical clamping jaws (4) arranged in the drill chuck head (2), wherein the conical clamping jaws (4) match the inner wall (7) and are guided longitudinally slidably on the inner wall (7) under a pretension force (5) acting outwardly;

a thrust member (8) arranged in a guide bore of the drill chuck housing;

wherein, when threading the drill chuck housing into the machine spindle (21), the thrust member (8) is configured to move in a longitudinal direction toward the receiving opening (6) and load a rearward surface (9) of the clamping jaws (4) facing away from the receiving opening (6), wherein the thrust member (8), when moving toward the receiving opening (6), simultaneously entrains the clamping laws (4) so that the clamping jaws (4) move toward one another into a clamping position;

wherein the thrust member (8) is longitudinally moveable in the guide bore of the drill chuck housing and is circumferentially centered (10, 12) along an entire longitudinal stroke in the longitudinal direction, wherein between the thrust member (8) and the guide bore a tight fit is provided;

a pair of truncated cone surfaces (16) provided between the machine spindle (21) and the thrust member (8), wherein the machine spindle (21) centers the thrust member (8) via the pair of truncated cone surfaces (16) when loading the thrust member (8);

wherein the guide bore is provided in the drill chuck plug (3);

wherein the end of the thrust member (8) facing the machine spindle (21) has an outer diameter smaller than an inner diameter of the drill chuck plug (3) so that between the thrust member (8) and the drill chuck plug (3) an annular gap space is formed, wherein the machine spindle (21) is hollow-cylindrical and projects into the annular gap space; and wherein a first one of the truncated cone surfaces (16) of the pair of truncated cone surfaces (16) is arranged on the thrust member (8) at the bottom (18) of the annular gap space and wherein a second one of the truncated cone surfaces (16) of the pair of truncated cone surfaces (16), matching the first one of the truncated cone surfaces, is arranged on the machine spindle (21) and rests on the first one of the truncated cone surfaces (16).

2. The miniature drill chuck according to claim 1, wherein the drill chuck plug (3) has an outer knurling and is pressed into the drill chuck head (2) and secured by the pressed-in knurling (13) against relative rotation.

3. The miniature drill chuck according to claim 2, wherein the knurling (13) extends only over a partial length of the drill chuck plug and wherein the partial length without knurling is inserted with play-free fit into a matching bore of the drill chuck head.

4. The miniature drill chuck according to claim 2, wherein the drill chuck plug (3) has a circumferential collar forming an insertion stop and resting on a rearward end face of the drill chuck head (2) facing away from the receiving opening (6), wherein the drill chuck plug (3) has an annular cutout (25) between the circumferential collar and an end of the knurling (13) remote from the receiving opening (6).

5. The miniature drill chuck according to claim 1, wherein a length of the thrust member (8) in the guide bore corresponds at least approximately to a diameter of the thrust member (8).

6. The miniature drill chuck according to claim 1, wherein the thrust member (8) is comprised of solid material and is weight-reduced with rotational symmetry.

7. The miniature drill chuck according to claim 6, wherein the thrust member (8) is weight-reduced by having a circumferential groove.

8. The miniature drill chuck according to claim 6, wherein the thrust member (8) is weight-reduced by being formed as a hollow sleeve.

9. The miniature drill chuck according to claim 1, wherein the drill chuck housing has key receiving surfaces (22) positioned in pairs opposite one another.

10. The miniature drill chuck according to claim 9, wherein the key receiving surfaces are provided on the drill chuck plug (3).

* * * * *